Jan. 1, 1957    R. F. LO PRESTI    2,776,044
TROUGHING ROLLER STRUCTURE FOR BELT CONVEYOR
Filed Sept. 20, 1955

INVENTOR.
Roy F. LoPresti
BY
Murray A. Gleeson
ATTORNEY

United States Patent Office 2,776,044
Patented Jan. 1, 1957

2,776,044

TROUGHING ROLLER STRUCTURE FOR BELT CONVEYOR

Roy F. Lo Presti, Chicago, Ill., assignor to Goodman Manufacturing Company, Chicago, Ill., a corporation of Illinois Application September 20, 1955, Serial No. 535,371

7 Claims. (Cl. 198—192)

This invention relates generally to belt conveyors of the type supported upon spaced flexible strands, and more particularly to an improved troughing roller assembly adapted to be supported on the spaced strands.

One of the objects of this invention is to provide a readily demountable troughing roller assembly for a belt conveyor, such assembly being held in firm clamping engagement with the rope strands of the conveyor by the weight of both the assembly and the loaded conveying reach.

Other objects and important features of the invention will be apparent from a study of the specification following taken with the drawing, which together describe and illustrate a preferred embodiment of the invention and what is now considered to be the best modes of practicing the principles thereof. Other embodiments of the invention may be suggested to those having the benefit of the teachings herein, and it is further intended that the scope of the invention not be limited by the precise embodiments herein shown, such other embodiments being intended to be reserved especially as they fall within the scope of the subjoined claims.

Figure 1:
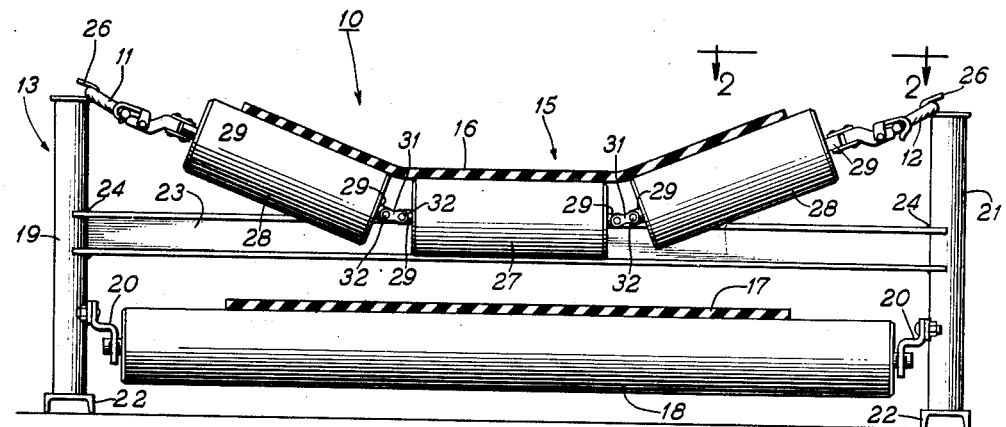
Fig. 1 is a transverse sectional view taken through an endless belt conveyor of the type which is supported upon spaced flexible strands, showing means for supporting the strand at spaced intervals, and showing an improved troughing roller assembly according to the present invention.

Referring now to the drawing, there is shown an endless belt conveyor referred to generally by the reference numeral 10. Such a conveyor is of the type having a pair of laterally spaced flexible support strands 11 and 12 which are mounted upon support strands indicated generally by the reference numeral 13, said support standards being disposed at spaced intervals throughout the length of the flexible strands.

A plurality of troughing roller assemblies indicated generally by the reference numeral 15 are supported at intervals along the spaced strands 11 and 12 between the standards 13. Each troughing roller assembly 15 supports the conveying reach 16 of an endless belt, a return reach 17 thereof being supported and guided upon a return idler 18.

The standard 13 comprises a pair of uprights 19 and 21, each of which has a bottom thereof welded to a foot 22, said foot being formed of a channel member in the manner shown. The two uprights 19 and 21 are maintained in properly spaced relationship by means of a laterally extending member 23, the ends thereof being welded at 24 to the uprights 19 and 21. The proximate faces of the uprights 19 and 21 have secured thereto brackets 20 which support each end of the return idler rod 18.

A saddle 26 is secured to the top of each of the uprights 19 and 21, and has a generally V-shaped configuration as shown, the two strands 11 and 12 being each supported on the saddles 26.

The troughing roller assembly 15 consists of a bottom load supporting roller 27 which is flanked by inclined troughing rollers 28, 28. Each of the rollers 27 and 28 has a shaft 29 extending from the ends thereof, and the shafts 29 are articulately connected to each other by links 31 which are pin connected at their ends as at 32 to the shafts 29.

The articulated connection described between the bottom load supporting roller 27 and the inclined troughing rollers 28, 28 is such that the rollers may deflect in a vertical plane in accordance with the load on the conveying reach 16.

Figure 2:
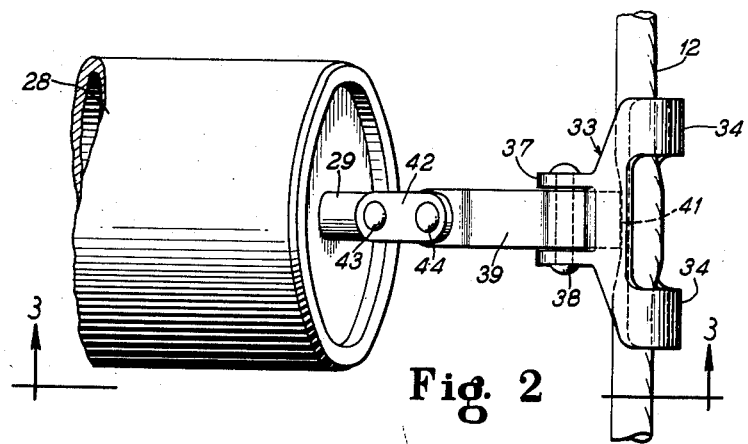
Fig. 2 is a plan view of a portion of the troughing roller assembly shown in Fig. 1 to an enlarged scale, and showing the manner in which the assembly is supported upon spaced strands.
Figures 3, 4:
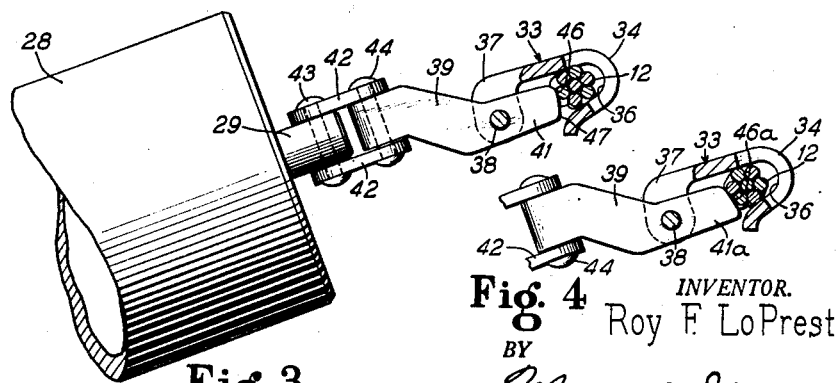
Fig. 3 is a view taken along the line 3—3 of Fig. 2 looking in the direction of the arrows.
Fig. 4 is a view similar to Fig. 3 showing an alternate embodiment of the invention.

Referring now to Figs. 2 and 3 of the drawing, the inclined troughing roller 28 is supported upon the strand 11 or 12 as the case may be, by means of a bracket 33 having a pair of spaced arms 34. Each of the arms 34 is bent as seen in Fig. 3 in the shape of a hook to provide a bight 36 which embraces the strand 11 or 12. The bracket 33 has a clevis extension 37, and a pin 38 thereat affords a pivotal connection for a locking member 39 to the bracket 33, the locking member 39 having one end 41 thereof extending between the spaced arms 34 and bearing against the flexible strand as seen in Fig. 3.

The other end of the locking member 39 is connected to the inclined troughing roller 28 by means of a pair of links 42 one end of the link 42 being pivotally connected by a pin 43 to the shaft 29, and the other end of the link 42 being connected by a pin 44 to the aforesaid end of the locking member 39.

It may be noted that the links 42 at the outward ends of the inclined troughing rollers 28 enable the entire troughing roller assembly 15 to shift to a position whereby the assembly is normal to the longitudinal axis of the conveying reach 16.

As seen in Figs. 1 and 3, the weight of the troughing roller assembly 15 and the load on the conveying reach 16 is such as to cause the locking member 39 to rotate in a counterclockwise direction about the pin 38. The end 41 extending between the spaced arms 34 has a surface 46 in contact with the flexible strand, and the load on the locking member 39 is such as to force the strand 12 into the bight 36 of the arms 34. However, the end 41 has a certain amount of rake 47 which tends to limit the amount of locking pressure by the locking member 39, the surface 46 on the end 41 moving past the center of the strand 12, yet providing for locking engagement of the troughing roller assembly 15.

The troughing roller assembly may be readily removed from engagement of the strands by lifting the inclined troughing rollers 28, so as to disengage the locking member 39 from the flexible strands. Thereupon, the brackets 33 may be rocked about pins 38 out of engagement with the flexible strand.

Referring now to Fig. 4 of the drawing, there is shown another embodiment where the locking member 39 has an end portion 41a with a surface 46a which tends at all times to increase the amount of engagement of the flexible strand. In this embodiment of the invention the surface 46a cannot override the center of the strand as was the case in Fig. 3.

It will be observed in the embodiment shown with respect to Fig. 4 that the counterclockwise rotation of the locking member 39 will increase the locking action in accordance with the weight on the troughing roller assembly 15. In the embodiment described with respect to Fig. 3 the amount of such locking engagement is limited by the over center movement of the end 41. In either embodiment it will be noted particularly with respect to Fig. 2 that the strand 12 is deformed slightly by the end 41 extending between the spaced arms 34. Such locking action enables the troughing roller assembly to employ the natural resistance to torsion of the strands to limit the extent to which the troughing roller assembly will hang in pendant fashion.

While the invention has been described in terms of a number of preferred embodiments thereof its scope is intended to be limited only by the claims here appended.

I claim as my invention:

1. In a belt conveyor, a pair of spaced flexible strands, a plurality of troughing roller assemblies spaced throughout the length of said strands for supporting the conveying reach of an endless belt, said troughing roller assemblies comprising a pair of inclined troughing rollers, means for connecting said inclined troughing rollers to its adjacent strand, said means comprising a bracket having a pair of spaced arms in hooking engagement with said strand, a locking member pivoted to said bracket and having one end extending between said spaced arms in contact with said strand, the other end of said locking member being connected to said inclined troughing roller, said locking member being rockable about its pivot point by the load on said inclined troughing roller, the end of said locking member in contact with said strand having a surface tending to wedge said strand into firmer engagement with said bracket upon increase in load on said troughing roller assembly so as to employ the torsional resistance of said strand to limit the vertical deflection of said troughing roller assembly.

2. In a belt conveyor, a pair of spaced flexible strands, a plurality of troughing roller assemblies spaced throughout the length of said strands for supporting the conveying reach of an endless belt, said troughing roller assemblies comprising a pair of inclined troughing rollers, means for connecting each of said inclined troughing rollers to its adjacent strand, said means comprising a bracket in engagement with said strand, a locking member pivoted to said bracket and having one end bearing against said strand, the other end of said locking member being connected to said inclined troughing roller, said locking member being rockable about its pivot point by the load on said inclined troughing roller, the end of said locking member in contact with said strand having a surface tending to wedge said strand into firmer engagement with said bracket upon increase in load on said troughing roller assembly so as to employ the torsional resistance of said strand to limit vertical deflection of said troughing roller assembly.

3. In a belt conveyor, a pair of spaced flexible strands, a plurality of troughing roller assemblies spaced throughout the length of said strands for supporting the conveying reach of an endless belt, said troughing roller assemblies comprising a pair of inclined troughing rollers, means for connecting said inclined troughing rollers to its adjacent strand, said means comprising a bracket having a pair of spaced arms in hooking engagement with said strand, a locking member pivoted to said bracket and having one end extending between said spaced arms, the other end of said locking member being connected to said inclined troughing roller, said locking member being rockable about its pivot point by the load on said inclined troughing roller, and the end thereof extending between said spaced arms contacting said strand so as to force said strand into firmer hooking engagement with the arms of said bracket, the end of said locking member in contact with said strand being adapted to override the center of said strand to limit the force of said locking member against said strand, yet locking said bracket to said strand.

4. In a belt conveyor, a pair of spaced flexible strands, a plurality of troughing roller essemblies spaced throughout the length of said strands for supporting the conveying reach of an endless belt, said troughing roller assemblies comprising a pair of inclined troughing rollers, means for connecting each of said inclined troughing rollers to its adjacent strand, said means comprising a bracket in hooking engagement with said strand, a locking member pivoted to said bracket and having one end bearing against said strand, the other end of said locking member being connected to said inclined troughing roller, said locking member being rockable about its pivot point by the load on said inclined troughing roller, the end of said locking member in contact with said strand being adapted to override the center of said strand to limit the force of said locking member against said strand yet locking said bracket to said strand.

5. In a belt conveyor, a pair of spaced flexible strands, a plurality of troughing roller assemblies spaced throughout the length of said strands for supporting the conveying reach of an endless belt, said troughing roller assemblies comprising a pair of inclined troughing rollers, means for connecting each of said inclined troughing rollers to its adjacent strand, said means comprising a bracket having a pair of spaced arms in engagement with said strand, a locking member pivoted to said bracket and having one end extending between said spaced arms, the other end of said locking member being connected to said inclined troughing roller, said locking member being rockable about its pivot point by the load on said inclined troughing roller, and the end thereof extending between said spaced arms contacting said strand so as to force said strand into firmer engagement with the arms of said bracket.

6. In a belt conveyor, a pair of spaced flexible strands, a plurality of troughing roller assemblies suspended on said strands at intervals thereon for supporting the conveying reach of an endless belt, said troughing roller assemblies comprising a pair of inclined troughing rollers, means for connecting each of said inclined troughing rollers to its adjacent strand, said means comprising a bracket in hooking engagement with said strand, a locking member pivoted to said bracket and having one end bearing against said strand, the other end of said locking member being connected to said inclined troughing roller, said locking member being rockable about its pivot point by the load on said inclined troughing roller, and the end thereof in contact with said strand forcing said strand into firmer hooking engagement with the arms of said bracket.

7. In a belt conveyor, a pair of spaced flexible strands, a plurality of troughing roller assemblies suspended on said strands at intervals thereon for supporting the conveying reach of an endless belt, said troughing roller assemblies comprising a pair of inclined troughing rollers, means for connecting each of said inclined troughing rollers to its adjacent strand including a locking member connected to its contiguous inclined troughing roller, said locking member being actuatable by the load on said inclined troughing roller to cause said means to be locked to the strand.

No references cited.